UNITED STATES PATENT OFFICE.

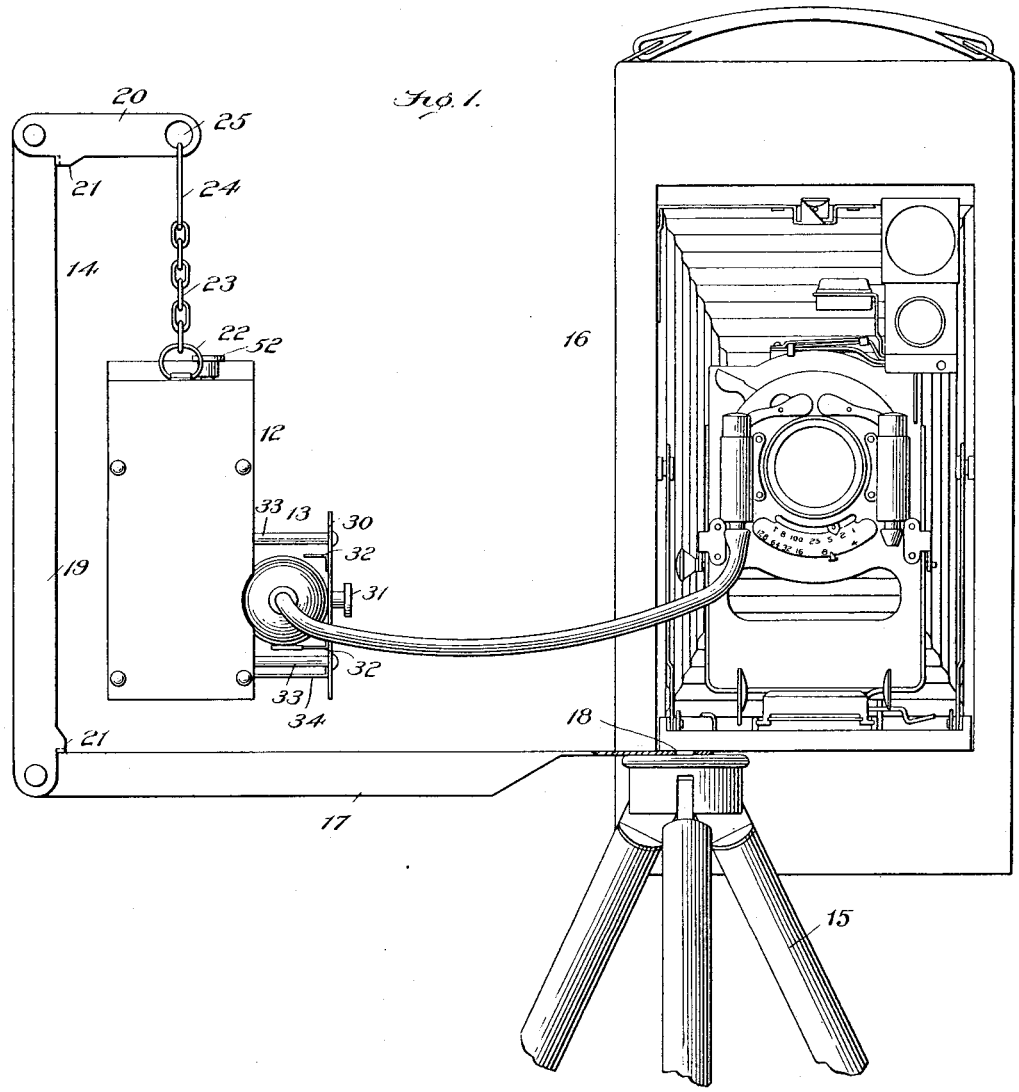
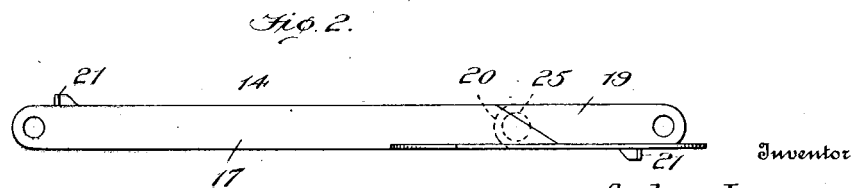

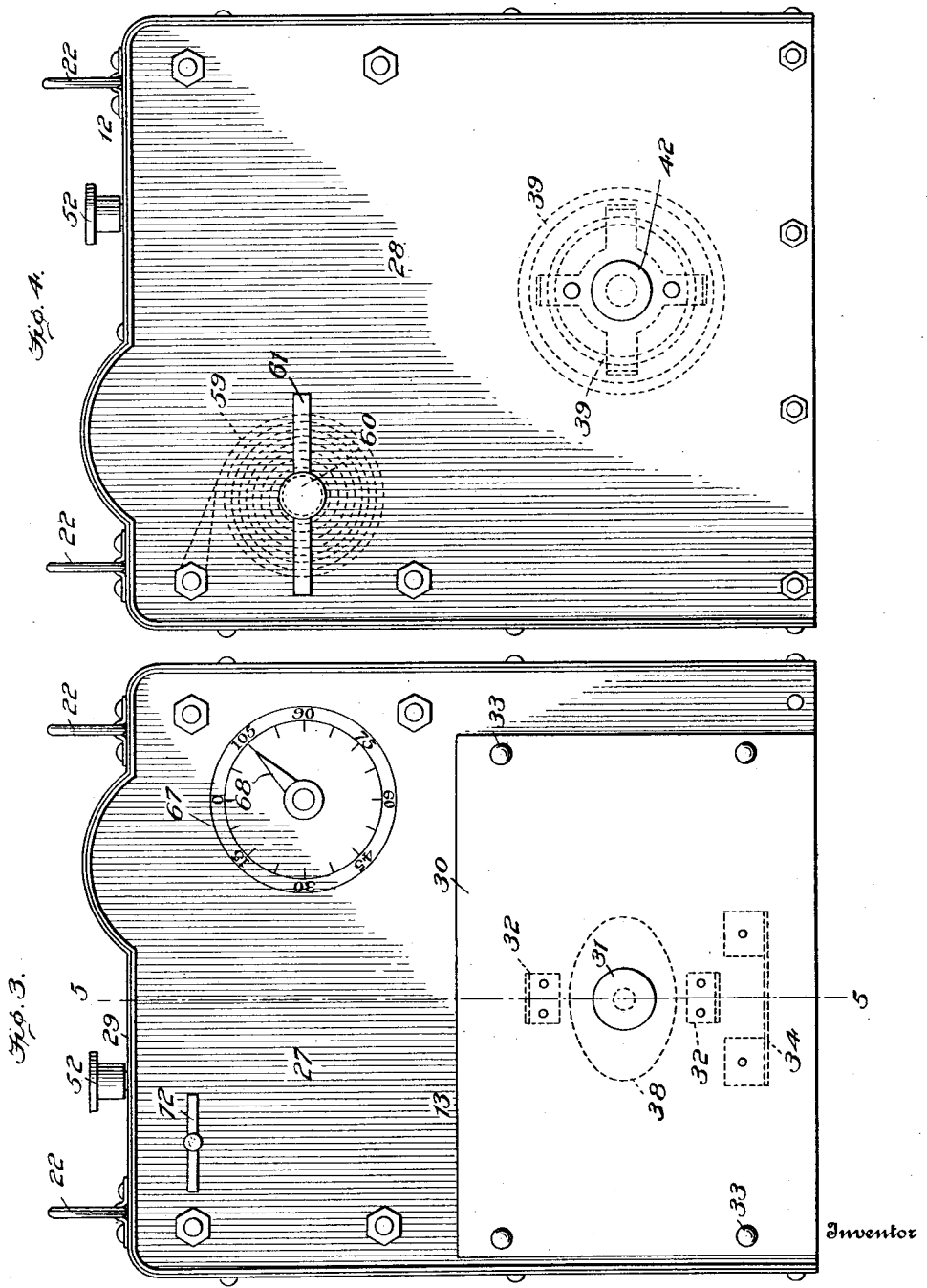

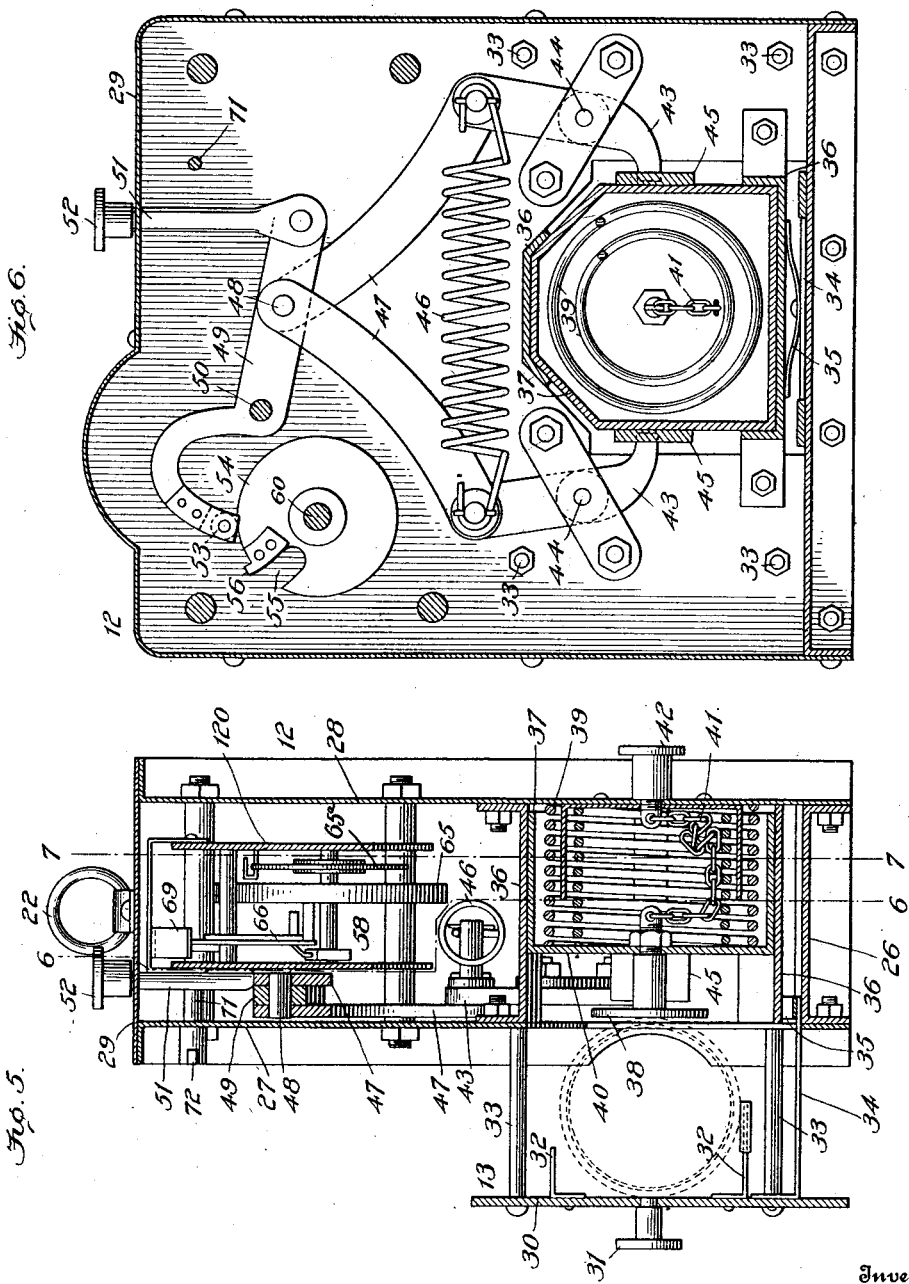

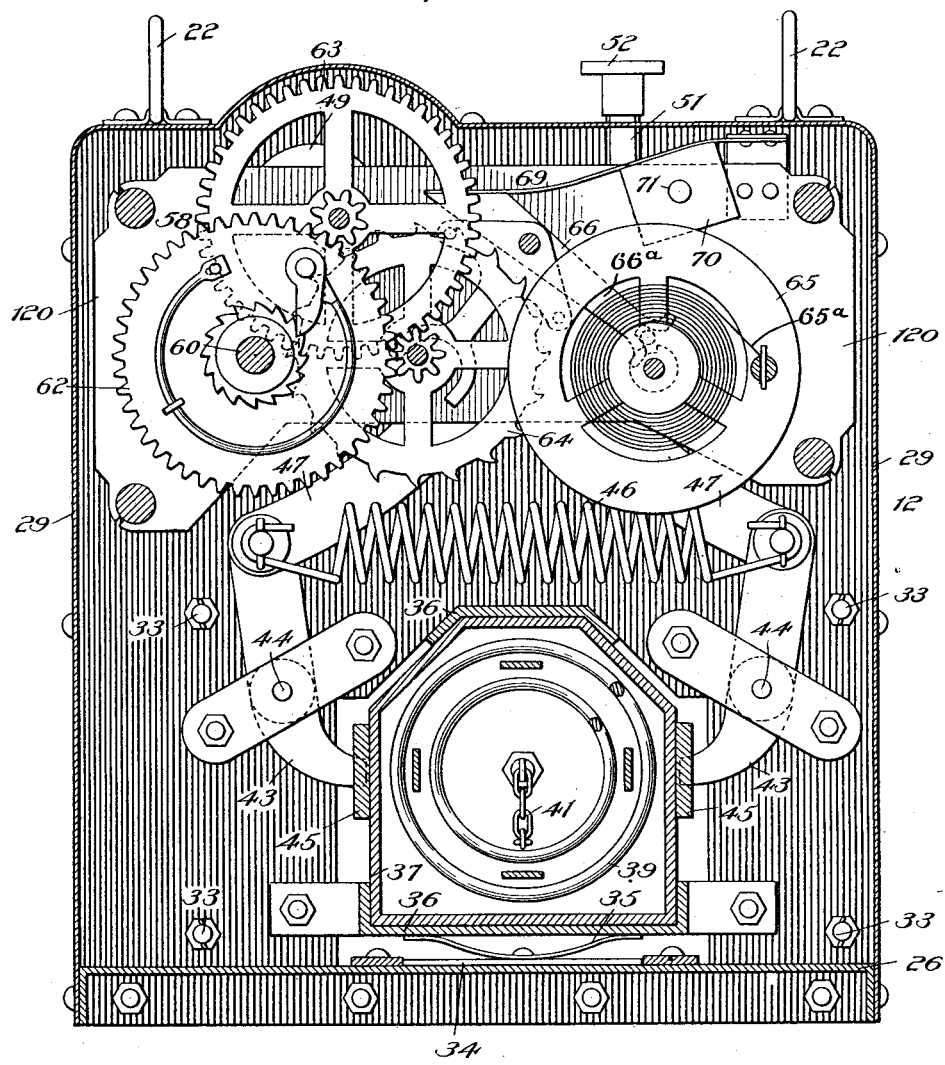

ARTHUR LATTAU, OF NEW YORK, N. Y.

AUTOMATIC PHOTOGRAPHING APPARATUS.

1,092,273. Specification of Letters Patent. Patented Apr. 7, 1914.

Application filed January 15, 1908. Serial No. 410,908.

*To all whom it may concern:*

Be it known that I, ARTHUR LATTAU, a citizen of the United States, residing at New York, in the county of New York and State of New York, have invented or discovered certain new and useful Improvements in Automatic Photographing Apparatus, of which the following is a specification, reference being had therein to the accompanying drawings.

This invention relates to an apparatus for automatically operating the shutter of a photographic camera at a predetermined time, in order to expose the film or plate contained within said camera.

The primary object of my invention is to provide an apparatus by which the photographer or operator of the camera can include himself in the picture taken by said camera. It will be understood, however, by those skilled in the art that the utility of my device is not limited to the purpose above referred to, but that it will be equally useful for other purposes, under circumstances where it becomes desirable to expose a photographic camera at a predetermined time, and in the absence of the operator. While a number of attempts have been made to produce a device adapted to accomplish these and similar purposes, so far as I am aware none of the devices so produced have been of a practical nature. Some of the reasons for the failure of these devices to operate properly and to become a commercial success are as follows: In order to cause a device of this character to operate at a predetermined time, some form of time-controlling mechanism is necessary, and for this purpose it has been proposed to employ clock-work, this clock-work serving to control the time of operation of the device for operating the camera shutter. Where this shutter-actuating device has been designed to operate upon a button, trip lever, or other part of the shutter actuating mechanism closely connected to and forming a more or less rigid part of the camera structure, it has been found that the impulse generated by the sudden operation of any mechanical device whatsoever will jar or move the camera sufficiently to spoil the picture. Camera shutters as now constructed, however, are, in the majority of cases, operatable by means of a flexible power transmitter, usually a flexible tube terminating in a rubber bulb, a pressure upon which serves to set into operation the mechanism for actuating the shutter. Due to the flexibility of the transmitter, the shock or jar of an impulse imparted to one end of it, will not necessarily be transmitted to the camera. As is well known to those skilled in the art, if said transmitter be a rubber tube, ending in a bulb, a considerable pressure upon said bulb is necessary in order to cause the shutter to operate. In order to generate this power it has been proposed to employ springs, entirely unsuited for this purpose on account of the small ratio of their working capacity to the volume of space which they occupy in the device. The selection of unsuitable types of springs, however, is not the only reason for the failure of devices, designed to compress the rubber bulb of a camera, to perform their function. These devices contain means for compressing the rubber bulb, a spring for actuating said bulb compressing means, means for holding said bulb compressing means inoperative, and a clockwork for controlling and removing said means for restraining the bulb-compressing means. The principal reason for the failure of such devices, as previously designed, to perform their function, is the fact that the clockwork during a very small part of its period of operation only is in engagement with the means for restraining the bulb compressing means. The bulb compressing means exercises a reaction on the means for holding it inoperative. The means for holding the bulb compressing means inoperative can be removed from the bulb-compressing means only by overcoming the friction between the engaging surfaces. To overcome this friction a certain amount of work expressible in inch pounds or fractions thereof must be done by the clockwork. In devices of this character as previously designed the clockwork is intended to perform this work during the very short time only of its engagement with the means for restraining the bulb compressing means, with the consequence that at the time such engagement takes place, the resistance to the movement of the clockwork is suddenly enormously increased, and the result, that the clockwork, unable to overcome this resistance, discontinues its movement and fails to perform its function, unless the dimensions of the clockwork are made so large that the mechanism becomes too heavy to be of practical utility, or unless the clockwork is made to move so slowly that satisfactory and accurate time control is unattainable.

A further objection to similar devices, as heretofore described in patent applications, has been the failure to provide suitable and practical means for supporting the apparatus. In all devices of this character at the time the shutter actuating means is operated a considerable jar or impulse is given to the apparatus itself, and, if the apparatus be supported upon the camera, this jar or impulse will again be communicated to the camera and spoil the picture taken thereby.

A further objection to similar devices as heretofore described in patent specifications has been that they have been so permanently attached to the camera structure as to be undesirable, it being obvious that a device of this character, in order to be practicable, must not form an integral part of the camera itself, since it is often desirable to use the camera without such device.

A further objection to such devices, as heretofore designed, is the fact that they do not allow of an accurate predetermination of the time of exposure due to the lack of a means for preventing the movement of the clockwork or time-controlling mechanism until the operator of the camera so desires.

The main objects, therefore, of my invention are to overcome the difficulties and objections above referred to, while further objects thereof will hereinafter appear.

To these ends my invention, in its preferred form, comprises a suitable receptacle for the end of the flexible power transmitter employed to operate the shutter of a camera; a suitable device, herein shown as a plunger, for operating upon said transmitter; means for actuating said device; a clock-work or other time-controlling mechanism; a locking device for restraining the operating device under the impulse of its actuating means; means, other than the clock-work or time-controlling mechanism proper, for withdrawing said locking device; and means controlled in its operation by said clock-work or other mechanism for controlling said withdrawing means in continuous engagement with said clockwork and the means for restraining said bulb-compressing means, thus creating a continuous train of continuously engaging links or elements between the clockwork or time controlling mechanism and the means for restraining the bulb-compressing means. By this arrangement, as also by other features hereinafter described, my invention is distinguished from other devices of this character, as heretofore designed, and the previously mentioned cause for the failure of such devices is removed.

In its preferred form my invention further comprises locking devices for the clockwork or time controlling mechanism for causing the same to discontinue its movement after the operation of said operating means on said flexible power transmitter, and for preventing the same from running off, after having been wound up, until desired by the operator of the apparatus; provisions for causing the discontinuation of the movement of the clockwork simultaneously with the compression of the bulb, by which arrangement a more accurate predetermination of the time of exposure can be attained than is otherwise possible; provisions for re-setting the various mechanisms after the exposure has been made; a dial or other indicator for showing the time at which the exposure will be made; and suitable means for supporting the mechanism as a whole independently of the camera proper and in such a manner that jars or shocks caused by said mechanism will not be communicated to the camera.

In the accompanying drawings, which illustrate one form in which my invention may be embodied; Figure 1 is an elevation of a camera and its tripod equipped with my improved device. Fig. 2 is a plan view of the supporting bracket for the device when folded and out of operation. Fig. 3 is a front, and Fig. 4 a rear elevation of my apparatus. Fig. 5 is a vertical transverse sectional view taken substantially on line 5—5, Fig. 3. Fig. 6 is a vertical section taken on line 6—6, Fig. 5. Fig. 7 is a similar sectional view taken substantially on line 7—7, of Fig. 5.

The mechanism of my apparatus is contained within a suitable casing 12 provided with a receptacle 13, preferably a drawer, adapted to receive the bulb of the camera shutter. In accordance with one feature of my invention I have provided what may be termed shock or vibration eliminating suspension means for the casing 12 and its inclosed mechanism. Such suspension means, in the construction herein shown, is furnished by a bracket 14 from which said casing is flexibly suspended as hereinafter more fully described. The bracket 14 is preferably constructed for attachment to the support 15 of the camera, said bracket, as herein shown, comprising a lower arm 17 provided with an aperture 18 adapted to receive the usual bolt, screw or threaded stud for attaching the camera to the tripod, an upright 19, and a supporting arm 20. The arms 17, 19 and 20 are preferably pivoted or otherwise jointed together in order that the device as a whole may be readily folded up, as shown in Fig. 2, and said arms 19 and 20 will preferably be provided with suitable stops 21 in order to maintain said arms in proper position when extended.

The casing 12 inclosing the mechanism hereinafter described is preferably loosely suspended from the arm 20, and to this end said casing is provided at its top with a pair of rings 22 loosely mounted thereon and adapted to receive suitable chains, cords, or other flexible connectors 23 carrying a hook or other device 24 adapted to enter a suitable aperture 25 in the arm 20 of the bracket 14.

With the construction just described it will be seen that the casing 12 is absolutely free to swing from its supporting arm 20, and that any jar or impulse occasioned by the mechanism within said casing will result only in a slight swinging movement of said casing and will in no wise be transmitted to the camera. It will furthermore be seen that said casing 12 is supported entirely independently of the camera, and that when not in use the bracket 14 may be readily removed and folded up, and the camera and its tripod used in the usual manner without my device.

The casing 12 comprises a bottom plate 26, a front plate 27, a preferably removable back plate 28, and a cover plate 29 for closing the sides and top of said casing, which cover plate may be made of a single piece or in separate parts, as described. Said plates 27, 28 and 29 are provided with suitable apertures for such parts of the mechanism as extend to the exterior of the casing, as will hereinafter be described.

In addition to the plates forming the casing 12 a framework, suitable for supporting the various moving parts of the mechanism, may be constructed within said casing 12, said framework being generically indicated in the drawings by the numeral 120.

The apparatus as a whole is preferably operatively connected with the shutter mechanism of the camera by a flexible power transmitter, herein shown as the usual rubber tube terminating in a hub which is received in the drawer 13, said drawer comprising a front plate or member 30 provided with a knob or handle 31 and with an inwardly projecting plate or plates 32 adapted to retain the bulb in position, a plurality of guide rods 33 rigidly secured to said plate 30 and passing through suitable apertures in the front plate 27, and a bottom or guide plate 34, preferably provided with a suitable leaf spring 35 adapted to bear against a fixed part of the framing and aid in guiding the drawer in its movements and in retaining the same in its proper adjusted position. The drawer 13 when pulled outwardly, as shown in Fig. 5, provides a suitable receptacle for the bulb, and when not in use may be pushed in where it will be out of the way and may, if desired, be held in its closed position by a suitable spring or other catch (not shown).

For the purpose of compressing the bulb when contained in said drawer or receptacle 13 there is provided a suitable actuator, herein shown as a tubular plunger 37 mounted to slide in suitable guides 36, bolted or otherwise secured to the casing, and provided with a bulb-engaging knob or head 38 operatable through a suitable aperture in the front plate 27 of the casing. The means employed for giving the plunger 37 its forward impulse are preferably a spiral or coil spring 39 interposed between the forward face 40 of the plunger 37 and the plate 28 of the casing. As herein shown said spring 39 is a compound spring, this construction being used in order to generate a considerable force by mechanism requiring the least possible space. In order to return the plunger to its original position after operation, I preferably provide a suitable chain, cord, or other connector 41, attached at its forward end to the plunger 37, passing rearwardly through a suitable opening in the plate 28, and provided at its end with a knob or handle 42. Said handle 42 is preferably formed with a short threaded shank whereby it may be engaged with and attached to the plate 28 when not in use, as shown in Fig. 5. The thrust of the plunger against the front plate 30 of the drawer is transmitted to the front plate 27 of the casing by the rods 33, which are provided with heads or nuts on their inner ends, as shown in Fig. 6.

Suitable means are provided for restraining or locking the plunger 40 against movement under the influence of its actuating spring 39 until the proper time for its operation, said means preferably, and as herein shown, comprising a pair of levers 43, 43, suitably pivoted at 44, 44, to the casing or other fixed part of the mechanism, and engaging at their lower ends the plunger 37 or plates 45, 45, suitably secured thereto. Means, independent for its motive power of the time-controlling mechanism hereinafter described, are provided for moving the levers 43 out of the path of the plunger 37 at the proper time, said means as herein shown comprising a suitable tension spring 46 connecting the upper ends of the lever 43.

Pivoted to the upper ends of each of said levers 43 is one of a pair of toggle links 47, said toggle links being each suitably pivoted, at 48, to each other and to a lever 49 pivoted at 50 to a fixed part of the casing or frame, and carrying at one end a suitable operating rod 51 extending through an opening in the casing and provided at its outer end with an operating knob 52. The end of the lever 49 opposite to the rod 51 is preferably curved, as shown in Fig. 6, said curved end resting upon a movable member or stop herein shown as a cam 54 and being preferably provided with a roller 53 coöperating with said cam. The cam 54 is preferably substantially circular in form as shown, and is provided with a depression, notch or recess 55 adapted to receive the curved end of the lever 49 and its cam roll 53, and with a stop 56 adjacent said recess, which stop may be formed integral with said cam or attached thereto as desired. The end of the lever 49 is preferably constructed substantially to fit the notch or recess 55. By this construction and arrangement the entry of this member into said notch causes not only the compression of the bulb as hereinafter described, but also an immediate stopping of the clockwork.

It will now be seen that as long as the end of the lever 49 rests upon the circular portion of the cam 54 the opposite end of said lever will be held depressed, thereby acting through the toggle links 47 to maintain the levers 43 in locking engagement with the plunger 37, in opposition to the spring 46. If, however, the cam 54 be turned to a position permitting the roller 53 to drop into the recess 55, the spring 46 will immediately operate to withdraw the levers 43, thereby releasing the plunger 37 and permitting the spring 39 to move said plunger to compress the bulb and simultaneously further movement of the clockwork will be discontinued. Suitable means as hereinafter described for controlling the movement of the cam 54 are provided, but it will be seen that the withdrawal of the levers 43 will be entirely independent of the motive power furnished by said means, the lever 49 not being positively moved by the cam 54 but being merely permitted by said cam to move at the proper time under the influence of the spring 46. The only work which the motive power of said means for controlling the movement of the cam 54 has to perform is to overcome the friction between the roller 53 and the cam 54 while turning said cam. This work is distributed over the entire period of time from the moment the movement of the cam 54 begins till the release of the spring occurs, an arrangement which makes it possible to perform this work with a clockwork of reasonable dimensions.

Any suitable form of time controlling mechanism may be employed for rotating the cam 54, but I prefer to use, and have herein shown for this purpose, a clock-work, indicated generically in Fig. 7 by the numeral 58. Said clock-work will be actuated by the usual main spring 59 and comprises the usual winding post 60, key 61, intermeshing gears 62, 63, escapement mechanism 64, balance wheel 65 and hair spring 65ª. The character and proportions of the intermediate gearing 62, 63 will be designed in accordance with the requirements of the device in which they are to be used, while the escapement may be of any suitable or well-known type, that herein shown being one form of well-known lever escapement comprising a vibratory pallet 66 and an escapement lever 66ª.

The cam 54 is preferably mounted upon the winding post 60, and may be turned into any predetermined initial position by means of the key 61; said turning movement of the key and cam effecting at the same time a certain amount of winding up of the main spring 59. From the initial position into which it is turned by the key 61, the cam 54 will be turned by the clock-work 58 until the recess 55 comes opposite the roller 53, at which time the plunger 37 will be released and the bulb compressed. The time ensuing between the setting of the cam 64 and the operation of the plunger 37 will depend upon the arc through which said cam 54 is initially turned, and the amount of said initial turning movement, as also the amount of time still to pass before the operation of the bulb compressing means at any time after the mechanism has been started, will preferably be indicated upon a dial 67 upon the front-plate 27 by a suitable pointer 68 attached to said winding post 60. Said dial 67 will preferably be marked to indicate minutes or seconds as desired, and will indicate the time, after starting the mechanism under a predetermined adjustment, when the exposure will be made.

It is desirable that means be provided for restraining the movement or operation of the clock-work after the same has been set, and for releasing the same when desired. Said means will preferably comprise a removable stop adapted to be placed in the path of movement of some moving part of the clock-work, and as herein shown consists of a flat spring 69 suitably secured to a fixed part of the frame-work and adapted, when in normal position, to engage and restrain movement of the free end of the escapement lever 66ª. In order to remove the spring 69 and permit the mechanism to start, a suitable cam 70 is provided, said cam being mounted upon a stud shaft 71, suitably journaled in the frame work and in the plate 27 of the casing, and provided on the outside of said plate 27 with a suitable operating handle or key 72.

The operation and method of use of my improved device may be briefly reviewed as follows: The parts being substantially in the position shown in the drawings, with the bracket 14 in position on the tripod 15 supporting the camera 16, the automatic device suspended from the bracket 14, the drawer 13 drawn out and the rubber bulb placed within said drawer as shown in Fig. 1, the operator first turns the key 61 a sufficient distance to cause the pointer 68 to indicate upon the dial 67 the time which he wishes to ensue before the exposure takes place. If the apparatus is being used to enable the operator to include himself in the picture which he proposed to take this will, of course, be made sufficient to permit him to take his predetermined place. Everything being ready the key 72 is turned to cause the cam 70 to raise the spring 67 from the escapement lever 66ª and the clock-work is started. The cam 54 will now be turned through an arc of a length depending upon the initial setting of the mechanism until the recess 55 reaches the end of the lever 49, when the plunger will be released, the bulb compressed, and the exposure made.

In order to reset the apparatus after it has effected its function the following operations are performed. The key 72 is first turned into its initial position in order to cause the spring 69 to lock the clock-work. The operator then grasps the handle 42, disengages the same from the plate 28, and draws the plunger 37 back into its initial position against the opposition of the spring 39, and, when said plunger has been drawn fully back, depresses the rod 51, thus moving the levers 43 into position to lock the plunger and removing the roller 53 from the recess 55. The key 61 is now given a slight turn moving the notch 55 in the cam 54 away from the end of the lever 49, and the parts are again locked in their initial position.

The purpose of the stop 56, as will be seen, is to limit the retrograde or setting movement of the cam 54, thereby preventing its cam from being turned so far as inadvertently to permit the end of the lever 49 to enter the recess 55 prematurely.

From the foregoing it will be seen that I have provided a device adapted for the automatic exposure of a photographic camera at a predetermined time, and in the absence of the operator, which is free from the objections enumerated at the beginning of this specification.

The device is capable of compressing the shutter-operating bulb of a camera accurately and effectively at exactly the proper predetermined time without danger of the stoppage of the clock-work on account of undue load being placed thereon, and without in any way jarring the camera to which it is applied.

It will furthermore be seen that the device as a whole can be very cheaply manufactured, will be light in weight and will be of such a size as to take very little space in the camera carrying-case, while the bracket 14 may be readily folded and placed within the coat pocket of the operator.

It will furthermore be seen that the device which I have provided is entirely independent of the camera structure and can be used with practically any of the well-known types of camera now on the market without modification, while the camera can be used with or without said device as desired.

While I, in order that my invention may be readily understood, have shown and described the same as embodied in a particular construction I wish it to be distinctly understood that I do not limit myself to the precise construction shown, it being obvious that many changes might be made therein without departing from the spirit and scope of my invention.

Having thus described my invention what I claim and desire to secure by Letters Patent is:—

1. The combination with a device of the character described, comprising means for holding the end of a flexible power transmitter, a member for operating upon said transmitter, an actuating spring for said member, means for restraining said operating member and actuating spring and releasing the same, thereby imparting an instantaneous blow to the end of said power transmitter, a clockwork for regulating the operation of said restraining means, a locking mechanism for said clockwork, and means for manually releasing the same, of means for suspending said device and adapted to eliminate the shock of said blow.

2. The combination with a device of the character described comprising time controlling mechanism and mechanism controlled by said time controlling mechanism for automatically operating the shutter of a photographic camera, of means for operatively connecting said shutter operating means and shutter, a supporting bracket, and flexible connecting means for suspending said device from said bracket.

3. In a device of the character described, in combination, a casing, means whereby said casing may be loosely suspended, a drawer adapted to receive the end of a flexible power transmitter, said drawer being constructed to be received within said casing and to be drawn therefrom into operative position, means for operating upon said transmitter, a spring for actuating said operating means, means for holding said operating means inoperative, a spring for withdrawing said holding means at a predetermined time, manually operated means for resetting said operating means, manually operated means for resetting said holding means, a clockwork, means for restraining said clockwork, means for removing said restraining means, and suitable operative connections intermediate said clockwork and said holding means, said parts being contained within said casing and both said manually operated means being arranged to be accessible from the exterior of said casing.

4. In a device of the character described, in combination, a casing, means for holding the end of a flexible power transmitter, means for operating upon said transmitter, means for restraining said operating means, a spring for removing said restraining means, a clockwork for controlling the action of said spring, and means for resetting said restraining means; said operating means, restraining means, removing spring and clockwork being arranged within said casing and said resetting means being accessible from the outside of said casing and extending through said casing into the interior thereof.

5. In a device of the character described, in combination, a casing, means for holding the end of a flexible power transmitter, means for operating upon said transmitter, means for restraining said operating means, a spring for removing said restraining means, mechanism for controlling the time of action of said spring, means for locking said time controlling mechanism, and means for resetting said restraining means; said operating means, restraining means, removing spring and time controlling mechanism being arranged within said casing and said resetting means and locking means being accessible from the outside of said casing and extending through said casing into the interior thereof.

6. In a device of the character described, in combination, a casing, means for holding the end of a flexible power transmitter, means for operating upon said transmitter, means for restraining said operating means, a spring for removing said restraining means, a clockwork for controlling the action of said spring, means for causing the discontinuation of the movement of said clockwork simultaneously with the action of said operating means, and means for resetting said restraining means; said operating means, restraining means, removing spring and clockwork being arranged within said casing and said resetting means being accessible from the outside of said casing and extending through said casing into the interior thereof.

7. In a device of the character described, in combination, a casing, means for holding the end of a flexible power transmitter, means for operating upon said transmitter, an actuating spring for said operating means, means for restraining said operating means, a spring for removing said restraining means, a clockwork for controlling the action of said last-named spring, and means for resetting the actuating spring for said operating means; said actuating spring, restraining means, removing spring and clockwork being arranged within said casing and said resetting means being accessible from the outside of the casing and extending through said casing into the interior thereof.

8. In a device of the character described, in combination, a casing, means for holding the end of a flexible power transmitter, means for operating upon said transmitter, an actuating spring for said operating means, means for restraining said operating means, a spring for removing said restraining means, mechanism for controlling the time of action of said last-named spring, means for locking said time controlling mechanism, and means for resetting the actuating spring for said operating means; said actuating spring, restraining means, removing spring and time controlling mechanism being arranged within said casing and said resetting means and locking means being accessible from the outside of the casing and extending through said casing into the interior thereof.

9. In a device of the character described, in combination, a casing, means for holding the end of a flexible power transmitter, means for operating upon said transmitter, an actuating spring for said operating means, means for restraining said operating means, a spring for removing said restraining means, a clockwork for controlling the action of said last-named spring, means for causing the discontinuation of the movement of said clockwork simultaneously with the action of said operating means, and means for resetting the actuating spring for said operating means; said actuating spring, restraining means, removing spring and clockwork being arranged within said casing and said resetting means being accessible from the outside of the casing and extending through said casing into the interior thereof.

10. In a device of the character described, in combination, means for automatically opening a camera shutter, means for restraining said shutter opening means, a rotating cam for maintaining said restraining means in operative position and for releasing the same at a predetermined time, a clockwork for rotating said cam, a locking mechanism for said clockwork, and means for manually releasing the same.

11. In a device of the character described, in combination, means for holding a flexible power transmitter, means for operating upon said transmitter, means for restraining said operating means, means for withdrawing said restraining means, a clockwork, a movable member connected with said clockwork and continuously moved thereby when said clockwork is in operation for holding said restraining means against movement and for releasing the same at a predetermined time, a locking mechanism for said clockwork, and means for releasing the same.

12. In a device of the character described, in combination, means for holding a flexible power transmitter, means for operating upon said transmitter, means for restraining said operating means, means for withdrawing said restraining means, a time controlling mechanism, a movable member connected with said time controlling mechanism and continuously moved thereby when said mechanism is in operation for holding said restraining means against movement and for releasing the same at a predetermined time, and means for locking said time controlling mechanism.

13. In a device of the character described, in combination, means for holding a flexible power transmitter, means for operating upon said transmitter, means for restraining said operating means, means for withdrawing said restraining means, a time controlling mechanism, a movable member connected with said time controlling mechanism and continuously moved thereby when said mechanism is in operation for holding said restraining means against movement and for releasing the same at a predetermined time, means for locking said time controlling mechanism, and manually operated means for releasing said locking means.

14. In a device of the character described, in combination, means for automatically opening a camera shutter, means for restraining said shutter opening means, a lever for holding said restraining means in operative position, a cam for controlling said lever, means for withdrawing said restraining means when permitted by said lever, and a time controlling mechanism for operating said cam.

15. In a device of the character described, the combination with a spring-pressed plunger, of a pair of levers adapted to lock said plunger against movement, a spring connecting the ends of said levers, a pair of toggle links pivoted to said levers, a controlling lever pivoted to said links, and a time-controlling mechanism adapted to hold said controlling lever against movement and to release the same at a predetermined time.

16. In a device of the character described, the combination with a clockwork comprising a winding post and a spring for turning said winding post, of an indicator and a cam mounted on said winding post, means for automatically opening a camera shutter, mechanism connecting said means and cam, and means whereby said winding post may be turned simultaneously to wind said spring and to set said indicator and cam.

17. In a device of the character described, in combination, means for automatically opening a camera shutter, a pair of oppositely arranged stops adapted to engage and restrain said shutter opening means, and mechanism for holding said stops in place and for withdrawing the same at a predetermined time.

18. In a device of the character described, in combination, an actuator, a clockwork and connections for restraining said actuator and for releasing the same at a predetermined time, means for setting said clockwork, means for holding said clockwork inoperative after being set, and manually operated means independent of said setting means for releasing said holding means.

19. In a device of the character described, the combination with mechanism for automatically opening a camera shutter, of a clockwork for controlling the time of operation of said mechanism, a key for setting said clockwork, a spring adapted to engage a vibrating part of said clockwork, a cam for disengaging said spring, a shaft upon which said cam is mounted, and a key independent of said setting key for turning said shaft.

20. In a device of the character described, the combination with a plunger, a spring for actuating said plunger, and mechanism for controlling the time of operation of said spring, of a casing for inclosing said parts and provided with an opening, a chain for withdrawing said plunger in opposition to said spring and adapted to extend through said opening, and a handle carried by said chain and adapted when not in use to close said opening.

21. In a device of the character described, in combination, means for automatically opening a camera shutter, means for restraining said shutter opening means, a clockwork, a controlling lever connecting said restraining means and clockwork adapted when in normal position to maintain said restraining means in operative position and to release the same when permitted by said clockwork, a resetting rod for returning said lever to normal position, means for locking said clockwork, manually operated means for releasing said clockwork and a casing inclosing said parts, said resetting rod and manually operated releasing means being accessible from the exterior of said casing.

22. In a device of the character described, in combination, means for holding a flexible power transmitter, means for operating upon said transmitter, restraining mechanism for said operating means, a time controlling mechanism, a movable member connected with said time controlling mechanism and continuously moved thereby when said time controlling mechanism is in operation for holding said restraining mechanism against movement and for releasing the same at a predetermined time, means for resetting said operating means, means to reset said restraining mechanism to hold said operating means in reset position, and means to reset said time controlling mechanism to hold said restraining mechanism in reset position.

23. In a device of the character described, in combination, means for holding a flexible power transmitter, means for operating upon said transmitter, restraining mechanism for said operating means, a time controlling mechanism, a movable member connected with said time controlling mechanism and continuously moved thereby when said time controlling mechanism is in operation for holding said restraining mechanism against movement and for releasing the same at a predetermined time, means for resetting said operating means, means to reset said restraining mechanism to hold said operating means in reset position, means to reset said time controlling mechanism to hold said restraining mechanism in reset position, and means for holding said time-controlling mechanism against movement.

24. In a device of the character described, in combination, means for holding the end of a flexible power transmitter, means for operating upon said transmitter, means for restraining said operating means, a clockwork for controlling said restraining means, and a continuous series of interengaging members intermediate said clockwork and said restraining means, said members being interengaged during the entire period of movement of said clockwork.

25. In a device of the character described, in combination, means for holding the end of a flexible power transmitter, means for operating upon said transmitter, means for restraining said operating means, mechanism for controlling the time of operation of said restraining means, means for locking said time-controlling mechanism, and a continuous series of interengaging members intermediate said time controlling mechanism and said restraining means, said members being interengaged during the entire period of movement of said time-controlling mechanism.

26. In a device of the character described, in combination, means for holding a flexible power transmitter, means for operating upon said transmitter, means for restraining said operating means, a spring for withdrawing said restraining means, a clockwork, an element moving with said clockwork adapted to hold said restraining means against movement and to release the same at a predetermined time, and means for causing the discontinuation of the movement of said clockwork simultaneously with the release of said restraining means.

27. In a device of the character described, in combination, a casing, a drawer for holding the end of a flexible power transmitter, said drawer being movable into said casing and out of the same to provide a seat for the end of said transmitter, means for operating upon said transmitter, an actuating spring for said operating means, means for restraining said actuating spring, a clockwork for controlling said restraining means, means for simultaneously releasing said operating means and causing the discontinuation of the movement of said clockwork, and means for resetting said actuating spring after an operation of said operating means, all said parts being contained within said casing and said resetting means being accessible from the outside of the casing.

28. In a device of the character described, in combination, means for holding the end of a flexible power transmitter, means for operating upon said transmitter, means for restraining said operating means, a clockwork, and mechanism controlled by said clockwork for holding said restraining means in operative position, and releasing the same at a predetermined time and for discontinuing the movement of said clockwork when said restraining means has been released, said mechanism including a continuous series of interengaging members intermediate said clockwork and said restraining means, said members being interengaged during the entire period of movement of said clockwork.

29. The combination with a device of the character described comprising time controlling mechanism and mechanism controlled by said time controlling mechanism for automatically operating the shutter of a photographic camera; of means for operatively connecting said shutter operating means and shutter; a supporting bracket comprising an outstanding arm, an upright arm carried thereby, and an arm projecting outwardly from said upright arm, said arms being hinged together to permit said bracket to be folded; and flexible connecting means for suspending said device from said bracket.

30. In a device of the character described, in combination, a casing having a wall provided with a plurality of apertures; a plunger for acting on the end of a flexible power transmitter; a drawer for holding the end of said power transmitter and comprising a front plate, a handle, a seat for the end of said power transmitter and a plurality of members guided in said apertures in the casing wall, arranged to be received within said casing when the device is out of operation, and adapted to transmit to said wall the thrust of said plunger; and a friction spring arranged to hold said drawer in position when it is moved into the casing.

31. In a device of the character described the combination with a casing, of means for holding the end of a flexible power transmitter, a plunger for acting on said power transmitter, a spring for actuating said plunger, means for restraining said plunger, a spring for withdrawing said restraining means, a clockwork for controlling the time of such withdrawal, a locking mechanism for said clockwork, all of said parts being contained within said casing, and manually operatable means for releasing said clockwork, said last named means being accessible from the outside of said casing.

32. In a device of the character described, in combination, means for holding the end of a flexible power transmitter, means for operating upon said transmitter, a clockwork, means controlled by said clockwork for restraining and releasing said operating means and for causing the discontinuation of the movement of said clockwork simultaneously with said release, means for indicating the time of said release, and means for simultaneously winding said clockwork and setting said indicating means.

33. In a device of the character described, in combination, means for holding the end of a flexible power transmitter, means for operating upon said transmitter, means for restraining said operating means and releasing the same, a clockwork for controlling the time of release of said operating means, a continuous series of interengaging elements between said clockwork and said restraining means, said elements being engaged during the entire period of movement of said clockwork, means for indicating the time of said release, and means for simultaneously winding said clockwork and setting said indicating means.

34. In a device of the character described, in combination, means for holding the end of a flexible power transmitter, means for operating upon said transmitter, means for restraining said operating means, a clockwork, mechanism controlled by said clockwork for holding said restraining means in operative position and releasing the same at a predetermined time and for discontinuing the movement of said clockwork when said restraining means has been released, said mechanism including a continuous series of interengaging members intermediate said clockwork and said restraining means, said members being interengaged during the entire period of movement of said clockwork, means for indicating the time of said release, and means for simultaneously winding said clockwork and setting said indicating means.

35. An automatic operating-device for cameras comprising an actuating-spring, a locking device for holding said spring under tension, time-operating mechanism, movable between a starting and a stopping position, means carried by said mechanism to hold said locking-device in locking position when said mechanism is in starting position, and means to move said locking device out of locking position when said mechanism is moved to stopping position.

36. An automatic operating-device for cameras comprising an actuating-spring, a locking device for holding said spring under tension, time operating mechanism movable between a starting and an operating position and having a recessed face for holding said locking-device in locking-position when said mechanism is out of operating position, and means to move said locking device into said recess to release said spring when said mechanism is moved into operating position.

37. An automatic operating-device for cameras comprising an actuating-spring, a time-operating mechanism movable from a starting to an operating position, locking-devices for holding said spring under tension and said mechanism from movement, and means, controlled by said mechanism when it is moved to operating position, to move said devices to release said spring and lock said mechanism.

38. An automatic operating-device for cameras comprising an actuating-spring, a time-operating mechanism movable from a starting to an operating position, locking-devices for holding said spring under tension and said mechanism from movement, and means to move said locking devices simultaneously to release said spring and lock said mechanism when said mechanism is moved to operating position.

39. An automatic-operating-device for cameras comprising an actuating-spring, a time-operating mechanism movable from a starting to an operating position, a locking-arm having means to hold said spring under tension and said operating mechanism against movement, and means, controlled by said mechanism when moved to operating position to move said arm to disengage said spring and lock said mechanism.

40. In an automatic shutter controlling mechanism for cameras, the combination of a spring actuated air forcing device having a hose connection with the shutter operating mechanism, a detent for said air forcing device, a motor for governing the retraction of said detent, and an automatic stop mechanism for arresting the operation of said motor upon the release of said air forcing device, substantially as described.

In testimony whereof I affix my signature, in presence of two witnesses.

ARTHUR LATTAU.

Witnesses:
H. C. CLARKE,
ELMER M. LUTTGER.